Feb. 18, 1930.  R. B. FAGEOL  1,747,580
TRAILER
Original Filed Jan. 3, 1923   3 Sheets-Sheet 1
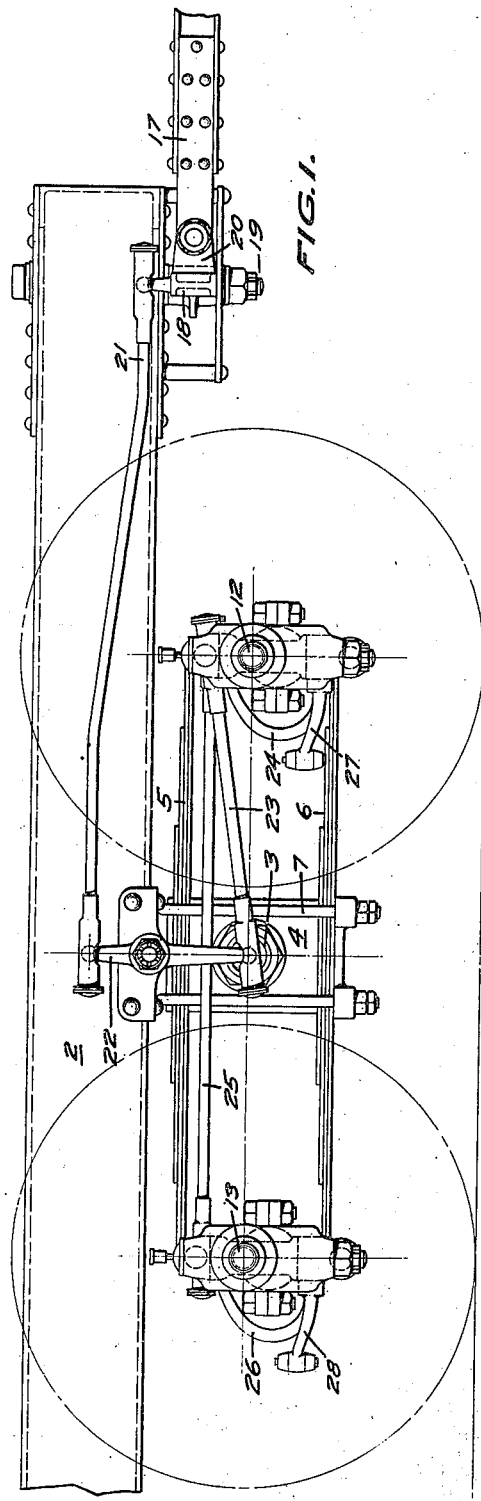
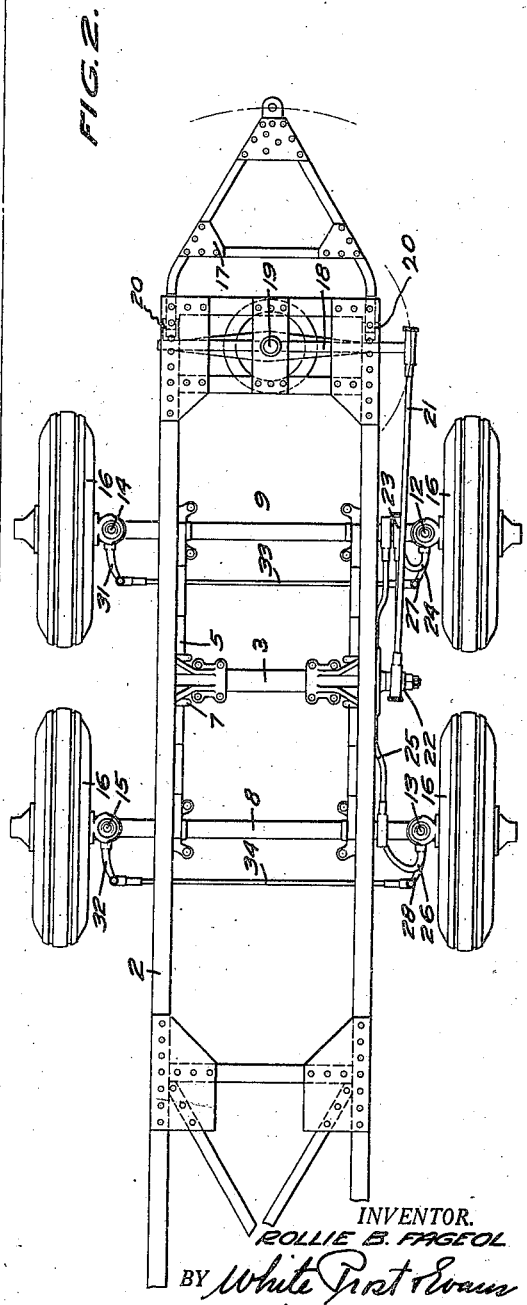
INVENTOR.
ROLLIE B. FAGEOL
BY White Prest Evans
his ATTORNEYS.

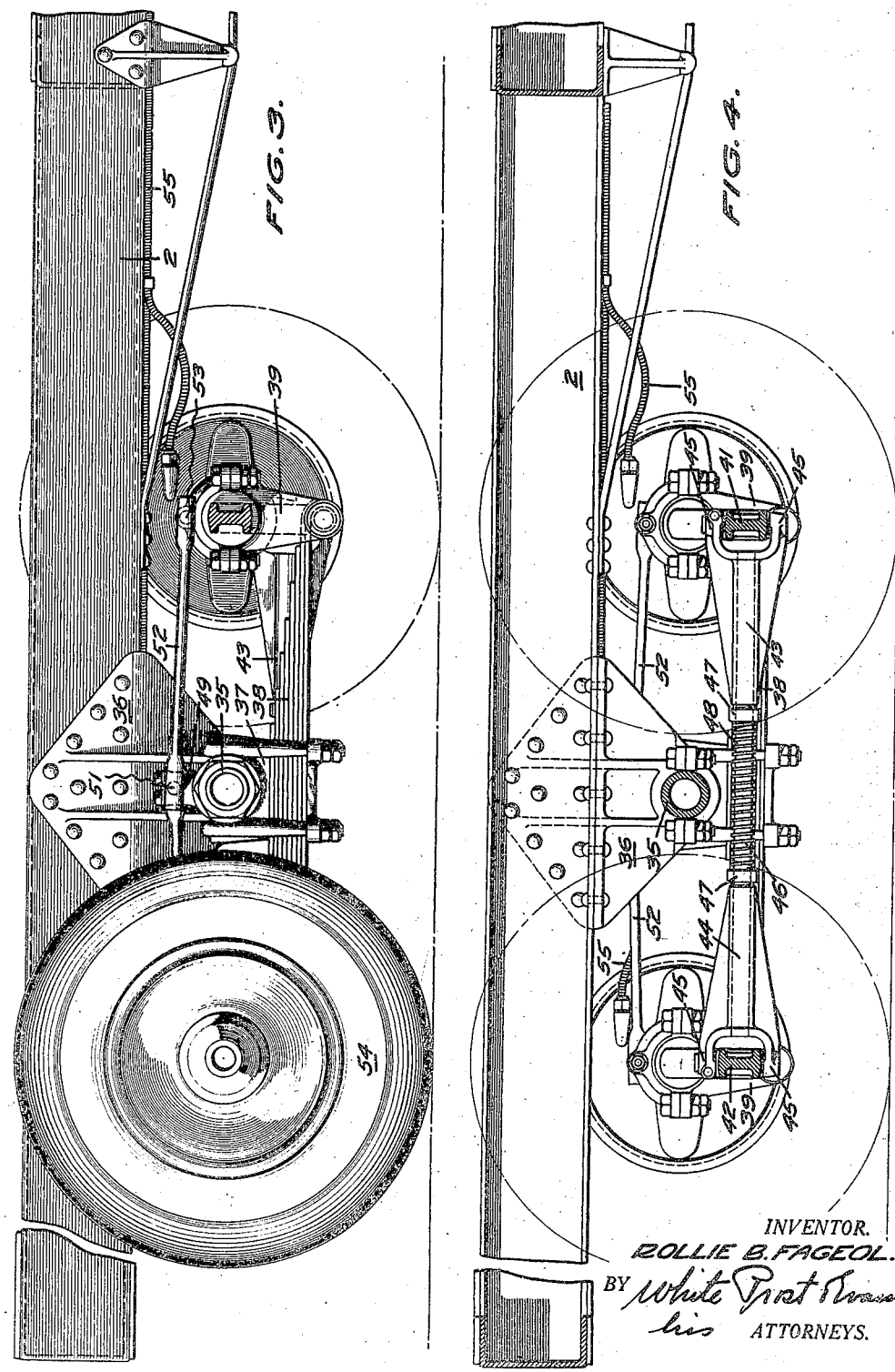

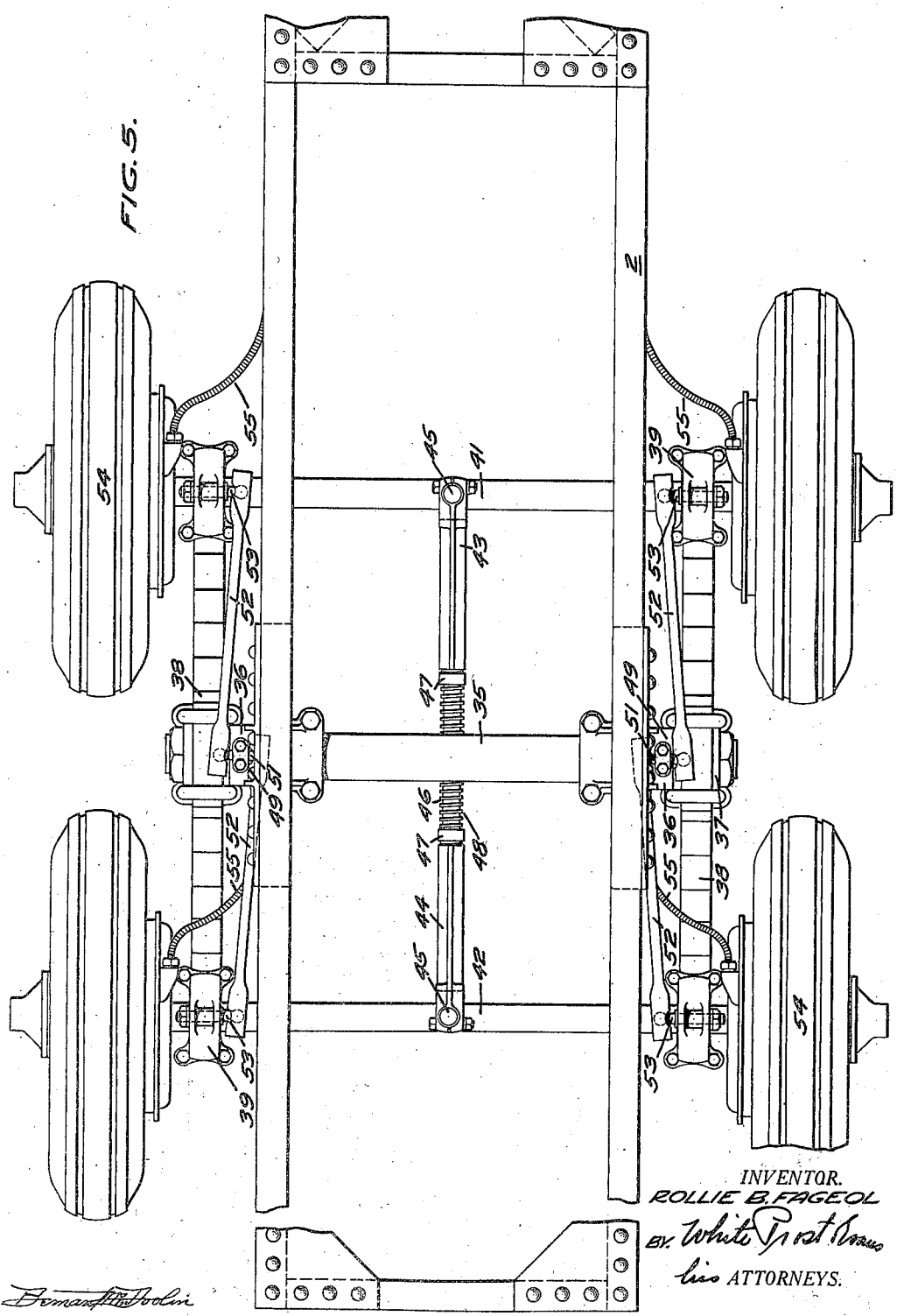

Patented Feb. 18, 1930

1,747,580

UNITED STATES PATENT OFFICE

ROLLIE B. FAGEOL, OF OAKLAND, CALIFORNIA

TRAILER

Application filed January 3, 1923, Serial No. 610,441. Renewed October 27, 1928.

The invention relates to trailers and particularly to dirigible trailers adapted to be drawn by a motor truck or tractor.

An object of the invention is to provide a heavy duty trailer which will not subject the roadway to deleterious stresses.

Another object of the invention is to provide a dirigible eight-wheeled trailer.

The invention possesses other advantageous features, some of which, with the foregoing, will be set forth at length in the following description, where I shall outline in full, the preferred form of the invention which I have selected for illustration in the drawings accompanying and forming part of the present specification. In said drawings I have shown one form of trailer of my invention, but it is to be understood that I do not limit myself to such form, since the invention, as set forth in the claims, may be embodied in a plurality of forms.

Referring to said drawings:—

Figure 1 is a side elevation of the front end of the trailer of my invention, the wheels being indicated.

Fig. 2 is a top or plan view of the front end of the trailer chassis.

Fig. 3 is an elevation of the rear end of the trailer chassis, one of the wheels being omitted.

Fig. 4 is a longitudinal vertical section through the rear end of the chassis.

Fig. 5 is a plan or top view of the rear end of the chassis.

The trailer of my invention comprises a suitable frame 2, having a four wheeled truck pivotally secured thereto at the front end and a four-wheeled truck pivotally secured thereto at the rear end, said trucks being pivoted on horizontal axes, as will be more fully set forth hereinafter. Each truck comprises two parallel spaced axles connected together by longitudinally disposed leaf springs, which are mounted at their centers on transverse shafts secured to the frame, so that each truck may oscillate about the axis of the transverse shaft. The two axles forming a truck may be connected together by two springs on each side of the frame or by one spring on each side of the frame and in the drawings, I have shown the front truck constructed in accordance with the first arrangement and the rear truck constructed in accordance with the second arrangement. Means are also provided for simultaneously turning the four front wheels of the trailer, to cause the trailer to follow the tractor.

Secured to the trailer frame adjacent its front end is a transverse shaft 3 on the ends of which are journalled blocks 4, to each of which are secured the leaf springs 5 and 6. The springs are secured to the block at their centers, or relatively inflexible portions, by the U-bolts 7, one spring being disposed above and the other being disposed below the block. At their outer or flexible ends, the springs are pivoted to hangers mounted on the axles 8 and 9 in such manner that the axles are capable of limited angular movement in the vertical plane with respect to the frame. Each axle is thus capable of independent angular vertical movement, producing easy riding qualities, on rough roads.

Mounted on the ends of the axles 8 and 9 by vertical or substantially vertical pivots, are the spindles 12, 13, 14 and 15 on which the dirigible wheels 16 are mounted. The axes of the spindles are so disposed that they lie in the horizontal plane of the shaft 3, when the trailer is normally loaded, thus reducing the fore and aft movement of the axles, due to their vertical displacement, to a minimum and further improving the riding qualities of the vehicle.

The four spindles of the front truck are connected together and to the draw-bar 17, which is attached to the tractor, so that the wheels move, as the tractor changes its direction of movement, to cause the trailer to follow the tractor. The draw-bar 17 comprises a triangular frame, pivoted at its rear end, to clevises 20 secured to the cross bar 18 carried by a vertical pin 19 disposed in the longitudinal axis of the vehicle. Connected to one end of the bar 18 is a drag-link 21, which is connected at its other end to the steering lever 22, pivoted to the frame 2 in the vertical plane of the shaft 3. Connected to the lower end of the steering lever 22, is a drag-link 23, which, at its other end, is connected to the steering arm 24 of the spindle 12. The point of connection of the lever 22 and the drag-link 23, lies on the axis of the shaft 3, so that vertical movements of the frame, due to spring action, will have a minimum effect on the steering of the trailer. The spindle 12 is connected to the spindle 13, by a drag-link 25 connecting the arm 24 with the arm 26 on the spindle 13. The spindles 12 and 13 are provided with second steering arms 27 and 28 which are connected to the steering arms 31 and 32 on the spindles 14 and 15 by the reach rods 33 and 34. Thus all four wheels of the front truck are steered by the angular movement of the draw-bar.

Adjacent its rear end, the trailer is provided with a transverse shaft 35 secured to brackets 36 secured to the frame and journalled on the ends of the shaft 35 are blocks 37 to which the leaf springs 38 are secured by bolts. The springs are preferably disposed below the shaft 35 and are pivoted at their flexible ends to hangers 39 mounted on and depending from the axles 41—42, which normally lie in the same horizontal plane as the shaft 35. The hangers are mounted on the axles in such manner that the axles have a limited free angular movement in the vertical plane with respect to each other and to the frame.

Since the rear truck is provided with only one spring on each side and since the hangers are rotatably mounted on the axles, means are provided for preventing rotation of the axles and for preventing them from spreading apart or approaching each other. Rotation or oscillation of the axles in the longitudinal vertical plane is prevented by the torque arms 43—44 connecting the axles at their centers. The torque arms are connected to the axles by vertical pivots 45 to permit relative angular movement of the axles in the horizontal plane, due to differences in flexure of the springs on opposite sides of the trailer and are provided with cylindrical longitudinal sockets in which the shaft or rod 46 is disposed, the shaft being capable of rotational and longitudinal movement in the sockets, but fitting sufficiently snug to prohibit relative angular movment of the arms in the vertical plane. The joints between the shaft and the telescoping torque arms are covered by dust caps 47 which are held in place by the spring 48.

The axles are prevented from materially varying their longitudinal spacing by radius rods connecting the hangers above the axles with the shaft 35. Formed on the shaft 35 or other stationary portion of the frame, at opposite sides of the vehicle, are projections 49 having studs 51 to which the ends of radius rods 52 are connected, by a ball and socket joint. The other ends of the radius rods are connected by similar joints to studs 53 extending from the hangers above the axles. The studs 51 are disposed in the vertical plane of the axis of the shaft 35 and the studs 53 are disposed in the vertical planes of the axles and the radius rods extend from the studs 53 to the studs 51. The radius rods therefore do not interfere with the spring action and are so disposed that their function is not affected by spring action.

The wheels 54 on the rear axles are preferably provided with hydraulic brakes actuated by fluid under pressure introduced through the flexible conduits 55.

I claim:

1. A trailer comprising a frame, a truck having four non-dirigible wheels under the rear end of the frame, the wheels being arranged in pairs, with one pair behind the other, a truck having four dirigible wheels arranged under the front end of the frame, the wheels being arranged in pairs with one pair behind the other, a draw bar adapted to be connected to a tractor, pivotally connected to the frame and means connecting the dirigible wheels with the draw bar.

2. A trailer comprising a frame, a four wheeled truck pivotally attached to the frame at the rear, the wheels being arranged in pairs with one pair behind the other, a four wheeled truck pivotally attached to the frame at the front, the wheels being arranged in pairs with one pair behind the other, the wheels on said front truck being dirigible, a draw bar pivotally connected to the frame and connections between the draw bar and the dirigible wheels.

3. A trailer comprising a frame, a transverse shaft carried by said frame adjacent the forward end thereof, a four-wheeled truck journalled on said shaft, said wheels being dirigible, a draw-bar pivoted to said frame, a steering lever pivoted to said frame, a link connecting the draw-bar with one end of the steering lever and means connecting the other end of the lever with the dirigible wheels, the connection between said means and the steering lever lying normally in the axis of said transverse shaft.

4. A vehicle comprising a frame; a pair of substantially parallel axles disposed beneath the forward end of said frame; resilient means interconnecting said axles and said frame; a pair of steering wheels supporting each axle; a steering linkage interconnecting said wheels for simultaneous movement; a steering control supported on said frame; and a connection between said frame supported control means and said steering linkages substantially in alignment with a neutral axis of motion of said linkage with relation to said frame.

5. A vehicle comprising a frame; a pair of substantially parallel axles disposed beneath the forward end of said frame; resilient means interconnecting said axles and said frame; a pair of steering wheels supporting each axle; a steering linkage interconnecting said steering wheels for simultaneous movement; steering means supported on said frame; and a connection between said frame supported steering means and said steering linkages substantially at a center of movement of an axle with relation to said frame.

6. A trailer comprising a frame, transverse shafts secured to the frame at the front and rear thereof, springs journalled at their centers on said rear shaft, a pair of axles attached to the ends of said springs, non-dirigible wheels on said axles, springs journalled at their centers on the front shaft, a pair of axles attached to the ends of said front springs, dirigible wheels on said front axles, a draw-bar and means connecting the draw-bar and the dirigible wheels.

7. A trailer comprising a frame, a transverse shaft carried by said frame adjacent the forward end thereof, a four-wheeled truck journalled on said shaft, the wheels on said truck being dirigible, a steering lever fulcrumed in the vertical plane of said shaft and means connecting one end of the steering lever with the dirigible wheels.

8. A trailer comprising a frame, a transverse shaft carried by said frame adjacent the forward end thereof, a four-wheeled truck journalled on said shaft, the wheels on said truck being dirigible, a steering lever fulcrumed in the vertical plane of said shaft and means connecting one end of the steering lever with the dirigible wheels, the point of connection of said means and lever lying normally in the extended axis of the shaft.

9. A road vehicle comprising a frame, a pair of axles disposed to support one end of said frame, a pair of dirigible wheels on each axle, springs pivoted between their ends to said frame at each side of the vehicle and connected adjacent their opposite ends to said axles, a steering arm on said frame, steering arms on each of said wheels, means interconnecting the steering arms of the wheels on both of said axles for joint movement, and mechanism including a drag link pivotally connected to said frame carried steering arm for movement about an axis coincident or approximately coincident with the axis of the spring pivot for operatively connecting said frame carried arm to said wheel carried arms.

10. The combination defined in claim 9 in which the axis of the spring pivot, the axis of the pivoted connection between said frame carried arm and drag link and the axes of the wheels on the same side of the frame are located in a substantially horizontal plane under normal load conditions.

11. A road vehicle comprising a frame, a pair of axles arranged to support one end of said frame, a pair of dirigible wheels on each axle, vertically spaced springs arranged above and below said axles at both sides of said frame, means to couple said spaced springs to said axles adjacent the spring ends, means to connect said springs together between their ends, said last named means being pivoted to said frame so that said springs and the axles connected thereto can swing about a fixed axis located between said springs and substantially in the horizontal plane that contains the axes of said wheels under normal load conditions, and mechanism partly carried by said frame and partly by said wheels to simultaneously steer all of said wheels, said mechanism including a drag link pivoted to frame and wheel carried steering elements so that the connection of said link to the wheel carried element is caused to move on an arc that is substantially parallel to the arc of movement of one of the wheels.

In testimony whereof, I have hereunto set my hand.

ROLLIE B. FAGEOL.